US009846661B2

(12) United States Patent
Margalit et al.

(10) Patent No.: US 9,846,661 B2
(45) Date of Patent: Dec. 19, 2017

(54) UTILIZATION OF SOLID STATE MEMORY DEVICES

(71) Applicant: EMPIRE TECHNOLOGY DEVELOPMENT LLC, Wilmington, DE (US)

(72) Inventors: Mordehai Margalit, Zichron Yaaqov (IL); Shmuel Ur, Galil (IL); David Hirshberg, Haifa (IL); Shimon Gruper, Haifa (IL); Menahem Kaplan, Tel Aviv (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 427 days.

(21) Appl. No.: 14/333,943

(22) Filed: Jul. 17, 2014

(65) Prior Publication Data

US 2016/0019172 A1 Jan. 21, 2016

(51) Int. Cl.
*G06F 13/28* (2006.01)
*G06F 13/40* (2006.01)

(52) U.S. Cl.
CPC .......... *G06F 13/28* (2013.01); *G06F 13/4022* (2013.01)

(58) Field of Classification Search
CPC ............................ G06F 13/28; G06F 13/4022
USPC ................ 711/103, 5, 154, 168; 365/185.33; 710/317
See application file for complete search history.

(56) References Cited

U.S. PATENT DOCUMENTS

| 6,038,630 | A  | * | 3/2000  | Foster ............... | G06F 13/1684 709/231 |
| 6,836,815 | B1 | * | 12/2004 | Purcell .............. | G06F 13/1657 710/317 |
| 6,954,821 | B2 | * | 10/2005 | Fitzsimmons ...... | G06F 13/4022 710/240 |
| 7,185,121 | B2 | * | 2/2007  | Fitzsimmons ...... | G06F 13/4022 710/244 |
| 7,234,018 | B1 | * | 6/2007  | Purcell .............. | G06F 13/1657 710/317 |

(Continued)

OTHER PUBLICATIONS

"A 32x32 Crossbar Switch Implementation Using the Lattice ispLSI 5384VE Device," Lattice, 2002, pp. 1-4.

(Continued)

*Primary Examiner* — Stephen Elmore
(74) *Attorney, Agent, or Firm* — Moritt Hock & Hamroff LLP; Steven S. Rubin, Esq.

(57) ABSTRACT

Technologies are generally described for systems, devices and methods effective to utilize a solid state memory device. A memory device may include one or more input/output ports effective to receive data at, and facilitate transfer from, the memory device. The memory device may further include a memory controller. The memory controller may be effective to control access to data stored in the memory device. The memory device may further include two or more flash chips effective to store data in the memory device. The memory device may further include a crossbar switch. The crossbar switch may be coupled between the one or more input/output ports and the two or more flash chips. The crossbar switch may be effective to enable the one or more input/output ports to access the two or more flash chips through the memory controller.

25 Claims, 7 Drawing Sheets

(56) References Cited

U.S. PATENT DOCUMENTS

| | | | | |
|---|---|---|---|---|
| 7,266,632 | B2* | 9/2007 | Dao | G06F 15/7867 710/100 |
| 7,565,475 | B2* | 7/2009 | Purcell | G06F 13/1657 710/317 |
| 7,574,482 | B2* | 8/2009 | Brown | G06F 13/4022 709/217 |
| 8,006,021 | B1* | 8/2011 | Li | G06F 13/4059 710/110 |
| 8,352,669 | B2* | 1/2013 | Wu | H04L 49/101 710/242 |
| 8,379,457 | B1* | 2/2013 | Chen | G06F 13/1689 365/185.18 |
| 8,381,003 | B2* | 2/2013 | Suzuki | G06F 13/4022 713/320 |
| 8,464,073 | B2* | 6/2013 | Salessi | G06F 21/31 380/28 |
| 8,694,754 | B2* | 4/2014 | Schuette | G06F 3/0616 711/103 |
| 8,767,471 | B2* | 7/2014 | Chen | G06F 13/1689 365/185.18 |
| 8,769,231 | B1* | 7/2014 | Ansari | G06F 3/0659 710/317 |
| 8,775,686 | B2* | 7/2014 | Stark | G06F 9/467 709/223 |
| 8,775,717 | B2* | 7/2014 | Prins | G06F 13/1657 710/317 |
| 9,069,603 | B2* | 6/2015 | Stark | G06F 9/467 |
| 9,292,380 | B2* | 3/2016 | Singh | G06F 11/1016 |
| 9,355,021 | B2* | 5/2016 | Ware | G06F 12/02 |
| 9,378,132 | B2* | 6/2016 | Parizi | G06F 12/0246 |
| 9,411,684 | B2* | 8/2016 | Holt | G06F 11/1076 |
| 2006/0174052 | A1* | 8/2006 | Kondo | G06F 13/4059 710/317 |
| 2009/0172308 | A1 | 7/2009 | Prins et al. | |
| 2011/0078496 | A1 | 3/2011 | Jeddeloh | |
| 2015/0169494 | A1* | 6/2015 | Robertson | G06F 1/3203 710/104 |
| 2015/0242128 | A1* | 8/2015 | Margalit | G06F 3/0608 711/103 |

OTHER PUBLICATIONS

Kumar, V., V. and Palaniswami, S., "A Dynamic Resource Allocation Method for Parallel DataProcessing in Cloud Computing," Journal of Computer Science 5, Science Publications., 2012, pp. 780-788, vol. 8, No. E.

Liu, M., et al., "Adaptively Reconfigurable Controller for the Flash Memory," IN-TECH, 2011, pp. 18.

Rosales, E., et al., "UnaCloud: Opportunistic Cloud Computing Infrastructure as a Service," Cloud Computing 2011: The Second International Conference on Cloud Computing, GRIDs, and Virtualization, 2011, pp. 187-194.

Tretau, R., et al., "IBM System Storage N series Hardware Guide," Redbooks, International Business Machines Corporation 2012, pp. 362.

Ahmadinia, A. et al., "A Practical Approach for Circuit Routing on Dynamic Reconfigurable Devices," Proceedings of the IEEE International Workshop on Rapid System Prototyping, 2005, pp. 84-90.

Elgindy, H. et al., "RMB—A Reconfigurable Multiple Bus Network," Proceedings of the International Symposium on High-Performance Computer Architecture, 1996, pp. 108-117.

Majer, M. et al., "The Erlangen Slot Machine: A Dynamically Reconfigurable FPGA-Based Computer," The Journal of VLSI Signal Processing, 2007, 15-31, 47(1).

Fekete, S. et al., "Minimizing Communication Cost for Reconfigurable Slot Modules," Proceedings of the International Conference on Field Programmable Logic and Applications, 2006, pp. 1-6.

Null, L. et al., "Performance Measurement and Analysis," in The Essentials of Computer Organization and Architecture, Chapter 10, published by Jones & Barlett, 2003, pp. 451-499.

* cited by examiner

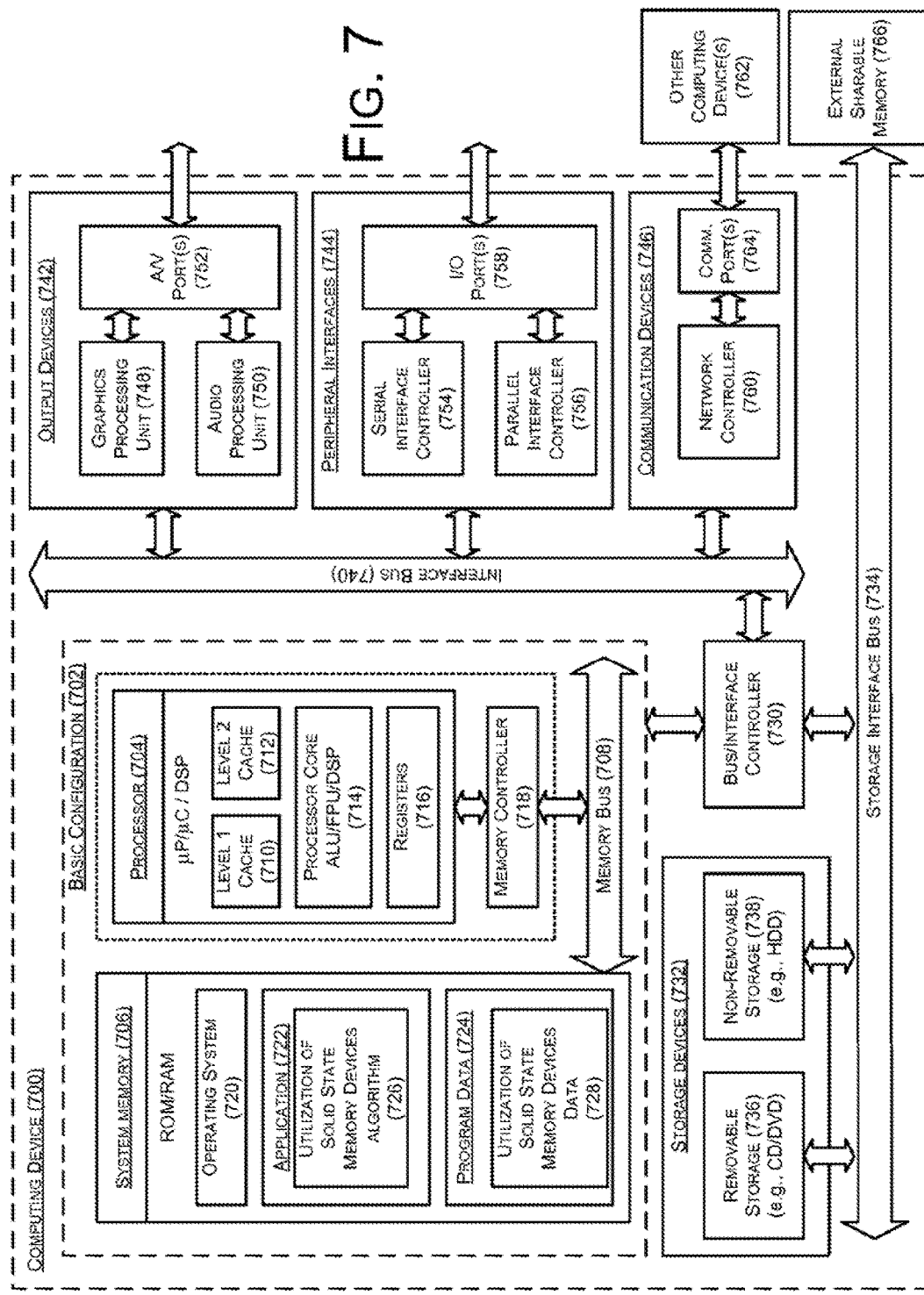

UTILIZATION OF SOLID STATE MEMORY DEVICES

BACKGROUND

Unless otherwise indicated herein, the materials described in this section are not prior art to the claims in this application and are not admitted to be prior art by inclusion in this section.

Flash-based solid state data storage devices may be used to handle intensive data access workloads. A flash memory system may include a multitude of transistors controlled by one or more solid state memory controllers. Each transistor within the flash memory system may be configured to store one bit of data. A solid state memory controller may be configured to control access to data stored within transistors of the flash memory system. Transistors in flash memory may have a limited number of program/erase cycles.

SUMMARY

In one example, memory devices are generally described. The memory devices may include one or more input/output ports. The one or more input/output ports may be effective to receive data at the memory devices and facilitate transfer of data from the memory devices. The memory devices may further include a memory controller. The memory controller may be effective to control access to data stored in the memory devices. The memory devices may further include two or more flash memory chips. The two or more flash memory chips may be effective to store data in the memory devices. The memory devices may further include a crossbar switch. The crossbar switch may be coupled between the one or more input/output ports and the two or more flash memory chips. The crossbar switch may be effective to allow the one or more input/output ports to access the two or more flash memory chips through the memory controller.

In one example, methods to operate a memory device are generally described. The memory device may include a memory controller, a first flash memory chip, and/or a second flash memory chip. The methods may include establishing communication between the first flash memory chip and a first data server. The methods may further include establishing communication between the second flash memory chip and the first data server. The methods may further include switching communication of the first flash memory chip from the first data server to a second data server while maintaining communication between the second flash memory chip and the first data server.

In one example, methods to operate memory devices are generally described. The methods may include determining, by a memory controller of a solid state storage device, that a processor element of the memory controller is not performing a data storage operation for the solid state storage device. The methods may further include, based on the determination, retrieving, by the memory controller, a mission. The mission may relate to processing of data in one or more flash memory chips of the solid state storage device that are accessible by the processor element. The methods may further include executing the mission by the processor element.

In one example, memory systems are generally described. The memory systems may include a solid state storage device. The memory systems may further include a first data server effective to be in communication with the solid state storage device. The memory systems may further include a second data server effective to be in communication with the solid state storage device and the first data server. The solid state storage device may include one or more input/output ports. The one or more input/output ports may be effective to receive data at the solid state storage device and facilitate transfer of data from the solid state storage device. The solid state storage device may further include a memory controller. The solid state storage device may further include a first flash memory chip and a second flash memory chip. The first and second flash chip may be effective to store data received through the one or more input/output ports in the solid state storage device. The solid state storage device may further include a crossbar switch. The memory controller may be effective to control access to data stored in the solid state storage device. The memory controller may be further effective to control operation of the crossbar switch. The crossbar switch may be effective to establish communication between the first data server and the first flash memory chip. The crossbar switch may be further effective to establish communication between the first data server and the second flash memory chip. The crossbar switch may be further effective to switch communication of the first flash memory chip from the first data server to the second data server while communication between the second flash memory chip and the first data server is maintained.

In one example, memory devices are generally described. The memory devices may include one or more input/output ports. The one or more input/output ports may be effective to receive data at the memory device and facilitate transfer of data from the memory devices. The memory devices may further include a memory controller. The memory controller may be effective to control access to data stored in the memory devices. The memory devices may further include two or more flash memory chips. The two or more flash memory chips may be configured to store data in the memory devices. The memory devices may further include a crossbar switch coupled between the one or more input/output ports and the two or more flash memory chips. The crossbar switch may be effective to allow the one or more input/output ports to access the two or more flash memory chips through the memory controller. The memory controller may be further effective to, while the memory controller is not performing a data storage operation for the solid state storage device, retrieve a mission from a memory. The mission may relate to data in at least one of the flash memory chips of the solid state storage device that is to be processed. The memory controller may be further effective to control a processor element of the memory controller to execute the mission. In controlling the processor element to execute the mission, the memory controller may provide access of the data by operation of the crossbar switch to couple the at least one of the flash chips to the one or more input/output ports.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 is a block diagram illustrating an example computing device that is arranged to implement utilization of solid state memory devices; all arranged according to at least some embodiments described herein.

DETAILED DESCRIPTION

Figure 1:
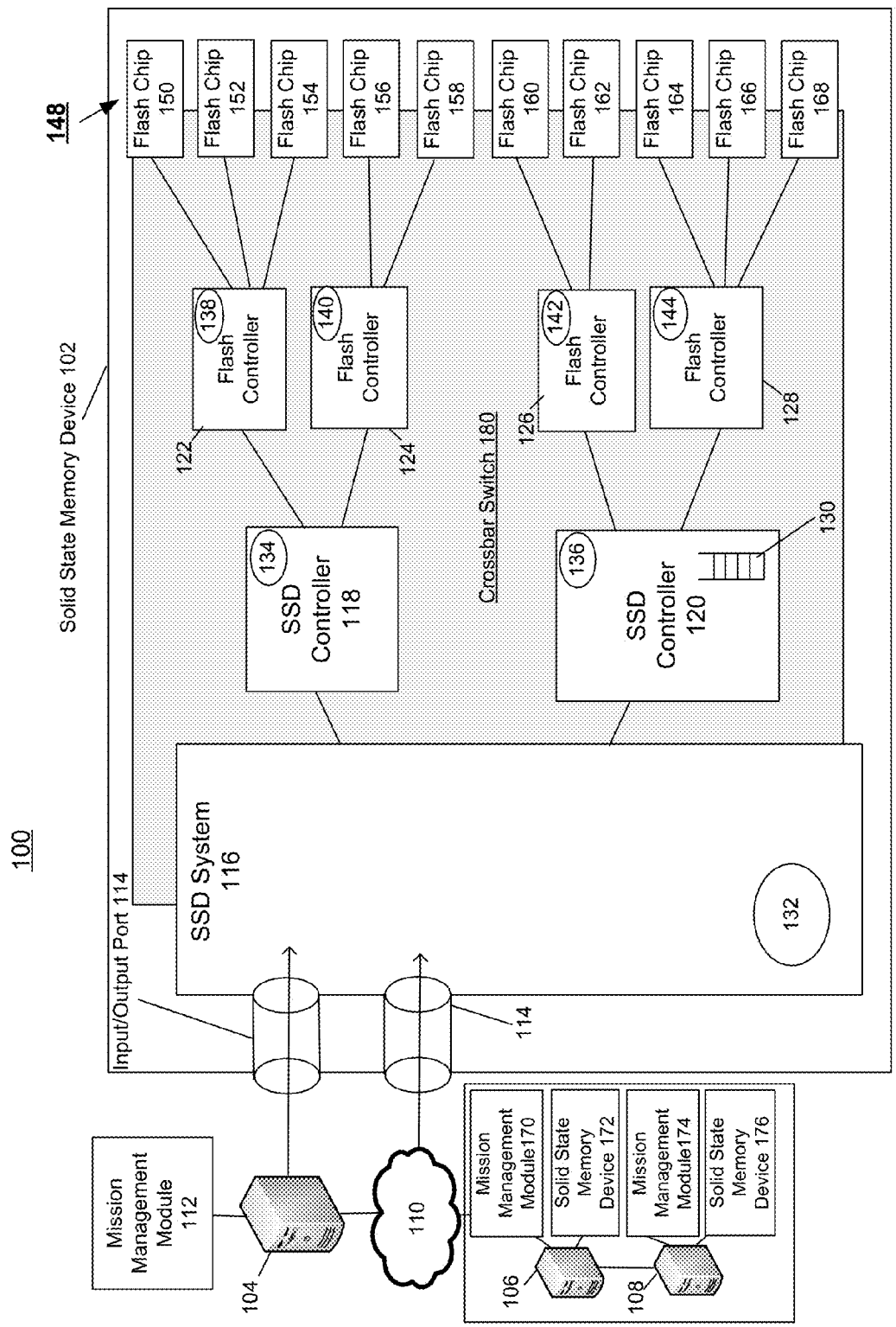
FIG. 1 illustrates an example solid state memory device with a mission management module.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to utilization of solid state memory devices.

Briefly stated, technologies are generally described for systems, devices and methods effective to utilize a solid state memory device. A memory device may include one or more input/output ports effective to receive data at, and facilitate transfer from, the memory device. The memory device may further include a memory controller effective to control access to data stored in the memory device. The memory device may further include two or more flash chips effective to store data in the memory device. The memory device may further include a crossbar switch. The crossbar switch may be coupled between the one or more input/output ports and the two or more flash chips. The crossbar switch may be effective to allow the one or more input/output ports to access the two or more flash chips through the memory controller.

FIG. 1 illustrates an example solid state memory device with a mission management module, arranged in accordance with at least some embodiments described herein. A memory system 100 may include one or more solid state memory devices 102, 172, 176, and one or more data servers 104, 106, 108 communicatively coupled to a network 110. Data servers 104, 106 and/or 108 may be embodied as computing devices configured in communication with one another across network 110.

Data server 104 may be configured in communication with solid state storage device 102. In one example, solid state storage device 102 may be included inside or outside of a housing of data server 104. Solid state memory device 102 may include input/output ports 114, a solid state device ("SSD") system 116, and one or more SSD controllers, including SSD controllers 118 and 120. Solid state storage device 102 may include one or more flash controllers, including flash controllers 122, 124, 126 and 128 and one or more flash chips 148, including flash memory chips 150, 152, 154, 156, 158, 160, 162, 164, 166 and 168. As will be discussed in more detail below, solid state storage device 102 may include a crossbar switch 180 coupled or otherwise configured between input/output ports 114 and flash chips 148. Crossbar switch 180 may be configured to allow or otherwise enable input/output ports 114 to access flash chips 148 through one or more memory controllers (including SSD controller 118 and/or SSD controller 120 and flash controllers 122, 124, 126 and/or 128). As is discussed in more detail below, through control of crossbar switch 180, solid state storage device 102 may access flash chips 148 in a variety of methods so that solid state storage device 102 may be used for both direct attached storage and network attached storage applications.

Input/output ports 114 may be embodied as ports configured to receive data at, and/or facilitate transfer of data from, solid state storage device 102. In an example, data received at solid state storage device 102 may be received by a SSD system 116. SSD system 116 may be configured to receive and transmit inputs and outputs of data through one or more input/output ports 114. In another example, SSD system 116 may be configured to manage file systems and/or manage resources of data server 104 and/or solid state storage device 102. In a further example, SSD system 116 may perform error correction and/or data recovery for data stored in solid state storage device 102.

SSD system 116 may be configured to be in communication with one or more SSD controllers including SSD controller 118 and/or SSD controller 120. SSD controllers 118, 120 may be embodied as memory controllers configured to control access to data in solid state memory device 102 through operation of one or more flash controllers including flash controllers 122, 124, 126 and/or 128. SSD controllers 118, 120 may include one or more ports. In another example, SSD controllers 118, 120 may perform cross chip read/write management operations across one or more flash chips 148 and/or replication for solid state storage device 102.

In the example shown, flash controller 122 may be embodied as a memory controller configured to control access to, for example, data stored in one or more flash memory chips 150, 152 and 154. Flash controller 124 may be embodied as a memory controller configured to control access to, for example, one or more flash memory chips 156 and 158. Flash controller 126 may be embodied as a memory controller configured to control access to, for example, one or more flash memory chips 160 and 162. Flash controller 128 may be embodied as a memory controller configured to control access to, for example, one or more flash memory chips 164, 166, and 168.

Flash memory chips 148 may be embodied as chips configured to store data in a plurality of transistors. Flash controller 122 may be configured to store information regarding wear-out status of one or more data blocks of flash memory chips 150, 152 and 154. Flash controller 124 may be configured to store information regarding wear-out status of one or more data blocks of flash memory chips 156 and 158. Flash controller 126 may be configured to store information regarding wear-out status of one or more data blocks of flash memory chips 160 and 162. Flash controller 128 may be configured to store information regarding wear-out status of one or more data blocks of flash memory chips 164, 166 and 168.

Also as is discussed in more detail below, SSD system 116, SSD controllers 118, 120 and flash controllers 122, 124, 126 and/or 128 may include one or more processor elements (including processor elements 132, 134, 136, 138, 140, 142 and/or 144). A processor element may be embodied as, for example, a central processing unit. A processor element may include one or more processor cores capable of executing one or more instructions.

Data servers 104, 106 and/or 108 may be configured to be in communication with one or more mission management modules (including mission management modules 112, 170 and/or 174). Mission management module 112 may be implemented as hardware or implemented as a combination of hardware and instructions executable on and/or by the hardware. Mission management module 112 may include a memory. Mission management module 112 may include instructions stored on the memory and configured to leverage the computing power of processor elements of solid state storage device 102. For example, mission management module 112 may store (in the memory) one or more tasks or missions to be retrieved by a particular one of processor elements 132, 134, 136, 138, 140, 142 and/or 144. A mission may be embodied as a set of instructions stored in the memory, and executable by one or more of processor elements 132, 134, 136, 138, 140 and 144 to perform one or more operations on data. A mission may act on data stored in one or more of flash chips 150, 152, 154, 156, 158, 160, 162, 164, 166 and 168.

In an example, processor element 134 may retrieve and execute missions stored in the memory of mission management module 112 at times when processor element 134 is not performing data storage related operations. In an example, data storage related operations may include read/write operations. In another example, data storage related operations may be defined individually for each processor element (including processor elements 132, 134, 136, 138, 140, 142 and/or 144). For example, processor element 142 of flash controller 126 may have a defined data storage operation related to reading data from, and/or writing data to, one or more of flash chips 160 and/or 162. In the example, mission management module 112 may store one or more missions. Processor element 142 of flash controller 126 may retrieve a mission from mission management module 112 and execute the retrieved mission at times or time frames when processor element 142 of flash controller 126 is not performing data reads of, or writes to, one or more of flash memory chips 160 and/or 162. In the example, if processor element 142 receives an instruction to engage in a data storage related operation during execution of a retrieved mission, processor element 142 may suspend execution of the mission and execute the data storage related operation. Processor element 142 may resume execution of the retrieved mission when execution of data storage related operations has completed.

Processor elements of solid state storage device 102 (including processor elements 132, 134, 136, 138, 140, 142 and/or 144) may retrieve particular missions from mission management module 112 based on data access profiles assigned to each processor element. For example, processor element 140 of flash controller 124 may be assigned a data access profile based on accessibility of data stored in one or more of flash memory chips 156 and/or 158. Accordingly, processor element 140 may retrieve a mission relating to processing of data stored in one or more of flash memory chips 156 and/or 158 based on the data access profile. In comparison, the data access profile for processor element 140 may indicate that processor element 140 is unable to access flash memory chip 168. Accordingly, the data access profile for processor element 140 may indicate that missions including operations on data in flash chip 168 may not be retrieved by processor element 140.

Processor elements of solid state storage device 102 may be configured to retrieve and store one or more missions in a queue based on the data access profile of the particular processor element. In an example, processor element 136 of SSD controller 120 may retrieve missions from mission management module 112 based on the data access profile for processor element 136. Processor element 136 may store retrieved missions in a queue in a memory 130. Missions stored in memory 130 may be queued, awaiting execution by processor element 136 of SSD controller 120. Processor element 136 of SSD controller 120 may execute a queued mission at times when processor element 136 is not performing data storage related operations.

Figure 2:
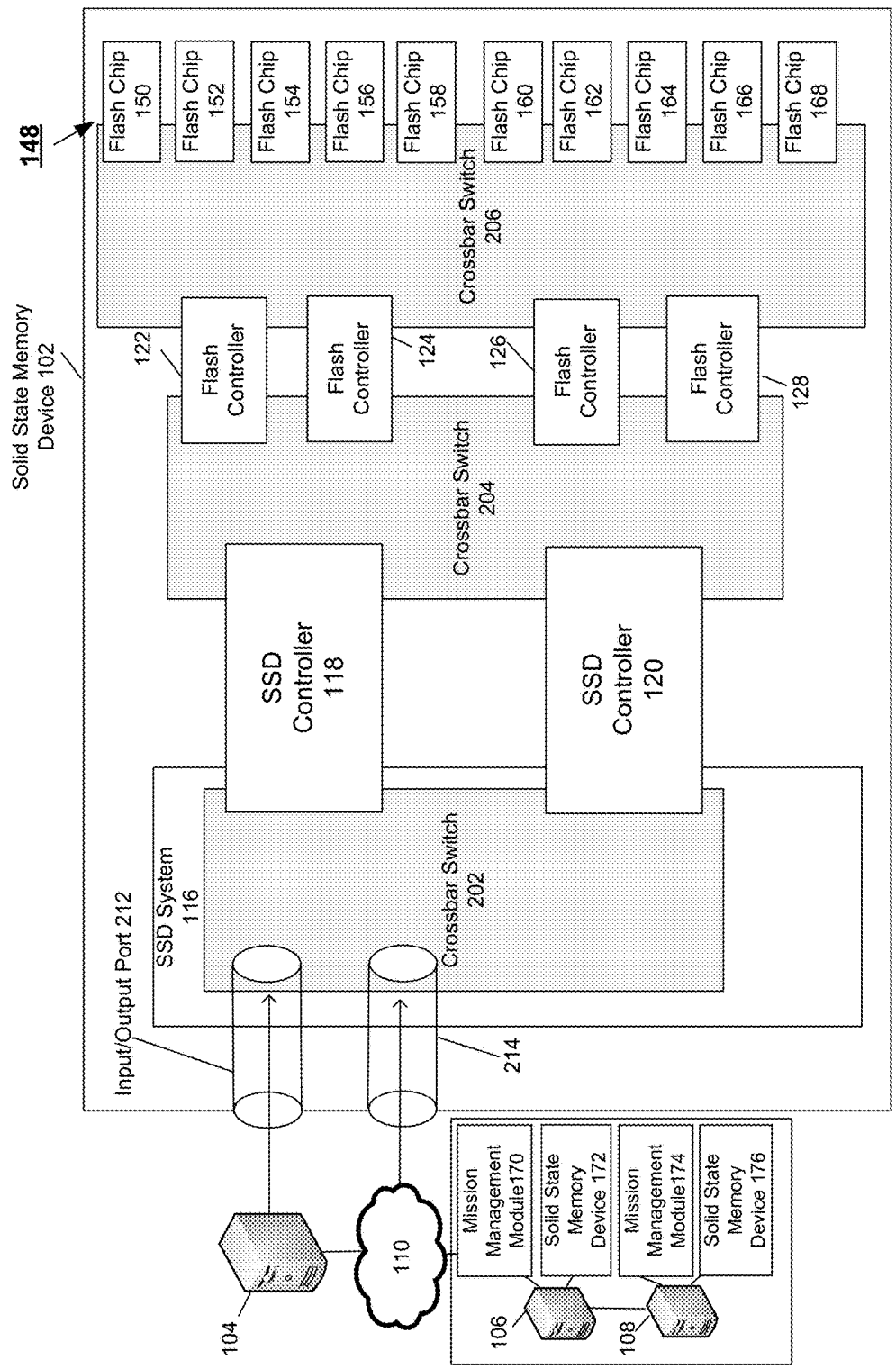
FIG. 2 depicts the example solid state memory device of FIG. 1 further illustrating crossbar switches.

FIG. 2 depicts the example solid state memory device of FIG. 1 further illustrating crossbar switches, arranged in accordance with at least some embodiments described herein. Those components in FIG. 2 that are labeled identically to components of FIG. 1 will not be described again for the purposes of clarity and brevity.

Solid state memory device 102 may include input/output ports 212, 214. Crossbar switch 180 may be implemented using one or more crossbar switches including crossbar switch 202, crossbar switch 204, and/or crossbar switch 206. Crossbar switch 202 may be configured to be located between input/output ports 212, 214 and SSD controllers 118 and 120. Crossbar switches 202, 204, and/or 206 may include a matrix of electronic switches. Electronic switches may include transistors, such as, for example, field effect transistors. In some examples, transistors of crossbar switches 202, 204, and/or 206 may provide an on/off switch which may couple a particular input to a particular output. In various examples, crossbar switches 202, 204, and/or 206 may include multiple switches, whereby for each output there may be a switch connecting the output to an input. Crossbar switch 202 may be embodied by a device capable of coupling, and/or establishing communication between, any two ports. For example, crossbar switch 202 may be coupled between input/output ports 212, 214 and SSD controllers 118 and 120. A connection or data communication channel provided by crossbar switch 202 may be dynamically changed and/or switched. In an example, at a time $t_1$, crossbar switch 202 may provide a data communication channel between input/output port 212 and SSD controller 118. At a time $t_2$, crossbar switch 202 may switch communication, from between input/output port 212 and a port of SSD controller 118, to communication between input/output port 212 and a port of SSD controller 120. At a time $t_3$, crossbar switch 202 may switch communication, from between input/output port 212 and SSD controller 120, to communication between input/output port 214 and a port of SSD controller 120. Other combinations of data communication channels between ports may be provided by crossbar switch 202. SSD system 116, SSD controller 118, data server 104 and/or another memory controller may control operation of crossbar switch 202.

Solid state memory device 102 may include crossbar switch 204. Crossbar switch 204 may be configured to be located between SSD controllers 118, 120 and flash controllers 122, 124, 126 and 128. Crossbar switch 204 may be embodied by a device capable of establishing communication between any two ports. For example, crossbar switch 204 may be coupled between SSD controllers 118 and 120 and flash controllers 122, 124, 126 and 128. A connection or data communication channel provided by crossbar switch 204 may be dynamically changed and/or switched. In an example, at a time $t_1$, crossbar switch 204 may establish communication between SSD controller 118 and flash controller 122. At a time $t_2$, crossbar switch 204 may switch communication, from between SSD controller 118 and flash controller 122, to communication between SSD controller 120 and flash controller 126. At a time $t_3$, crossbar switch 204 may switch communication, from between SSD controller 120 and flash controller 126, to communication between SSD controller 118 and flash controller 124. Other combinations of data communication channels between ports may be provided by crossbar switch 204. SSD system 116, SSD controller 118, data server 104, and/or another memory controller may control operation of crossbar switch 204.

Solid state memory device 102 may include crossbar switch 206. Crossbar switch 206 may be configured to be located between flash controllers 122, 124, 126, 128 and flash memory chips 150, 152, 154, 156, 158, 160, 162, 164, 166 and/or 168. Crossbar switch 206 may be a device capable of establishing communication between any two ports. For example, crossbar switch 206 may be coupled between flash controllers 122, 124, 126 and 128 and flash chips 148. A connection or data communication channel provided by crossbar switch 206 may be dynamically changed and/or switched. In an example, at a time $t_1$, crossbar switch 206 may establish communication between flash controller 124 and a port of flash memory chip 154. At a time $t_2$, crossbar switch 206 may switch communication, from between flash controller 124 and a port of flash memory chip 154, to communication between flash controller 128 and a port of flash memory chip 150. At a time $t_3$, crossbar switch 206 may switch communication, from between flash controller 128 and a port flash memory chip 150, to communication between flash controller 126 and a port of flash memory chip 166. Other combinations of data channels between ports may be provided by crossbar switch 206. SSD system 116, SSD controller 118, data server 104, flash controllers 122, 124, 126, 128, and/or another memory controller may control operation of crossbar switch 206.

Figure 3:
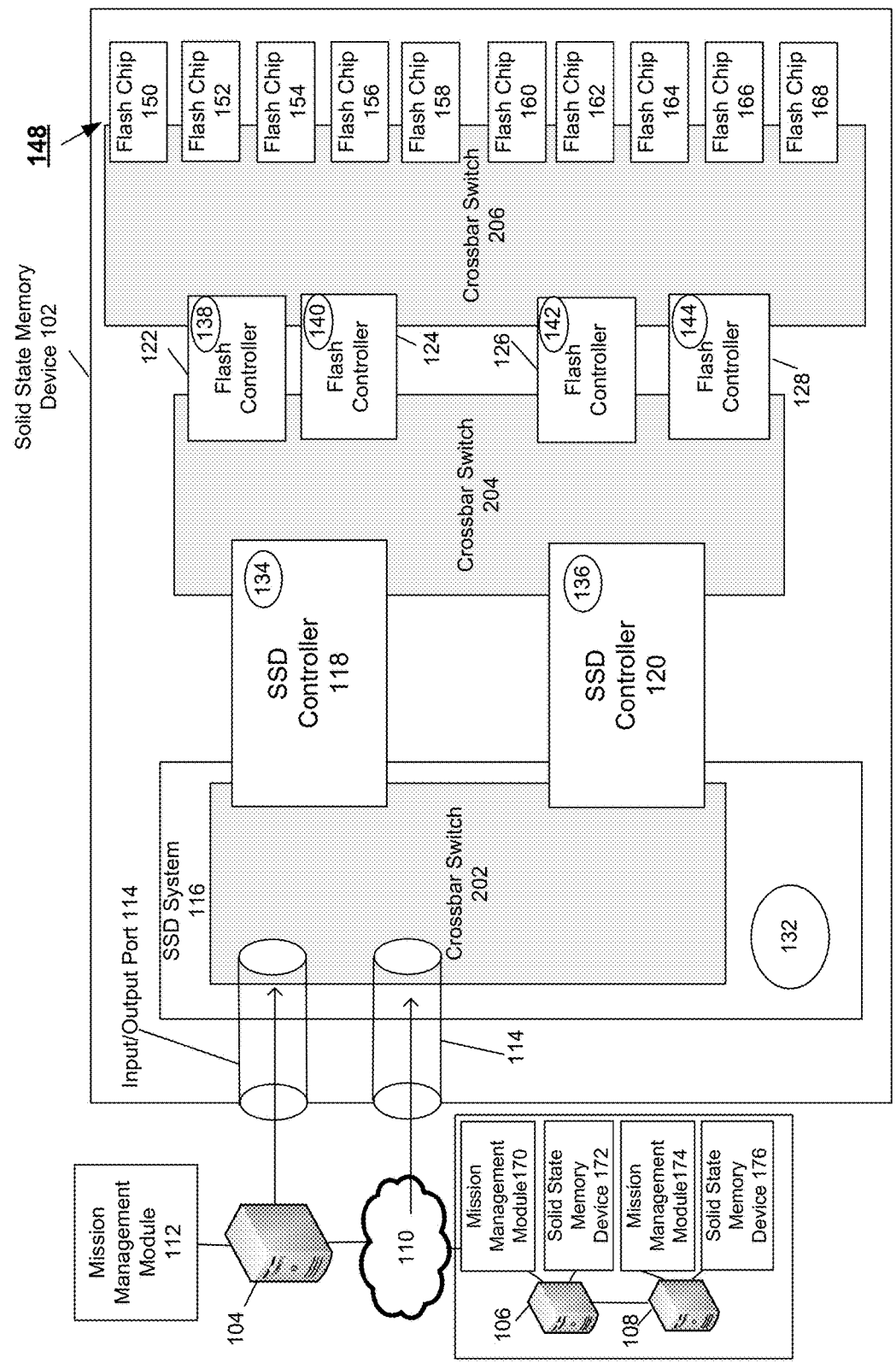
FIG. 3 depicts the example solid state memory device of FIG. 1 further illustrating memory controllers with processor elements.

FIG. 3 depicts the example solid state memory device of FIG. 1 further illustrating memory controllers with processor elements, arranged in accordance with at least some embodiments described herein. Those components in FIG. 3 that are labeled identically to components of FIGS. 1 and 2 will not be described again for the purposes of clarity and brevity.

In an example, data server 104 may be configured to be in communication with mission management module 112 and with solid state storage device 102. Solid state storage device 102 may include one or more of crossbar switches 202, 204 and 206. Solid state storage device 102 may include one or more processor elements, including processor elements 132, 134, 136, 138, 140, 142 and/or 144. Mission management module 112 may store one or more missions executable by processor elements of solid state storage device 102. Processor elements of solid state storage device 102 may retrieve and execute missions stored in mission management module 112 at times, or time frames, when processor elements of solid state storage device 102 are not performing data storage related operations such as between read/write operations.

Figure 4:
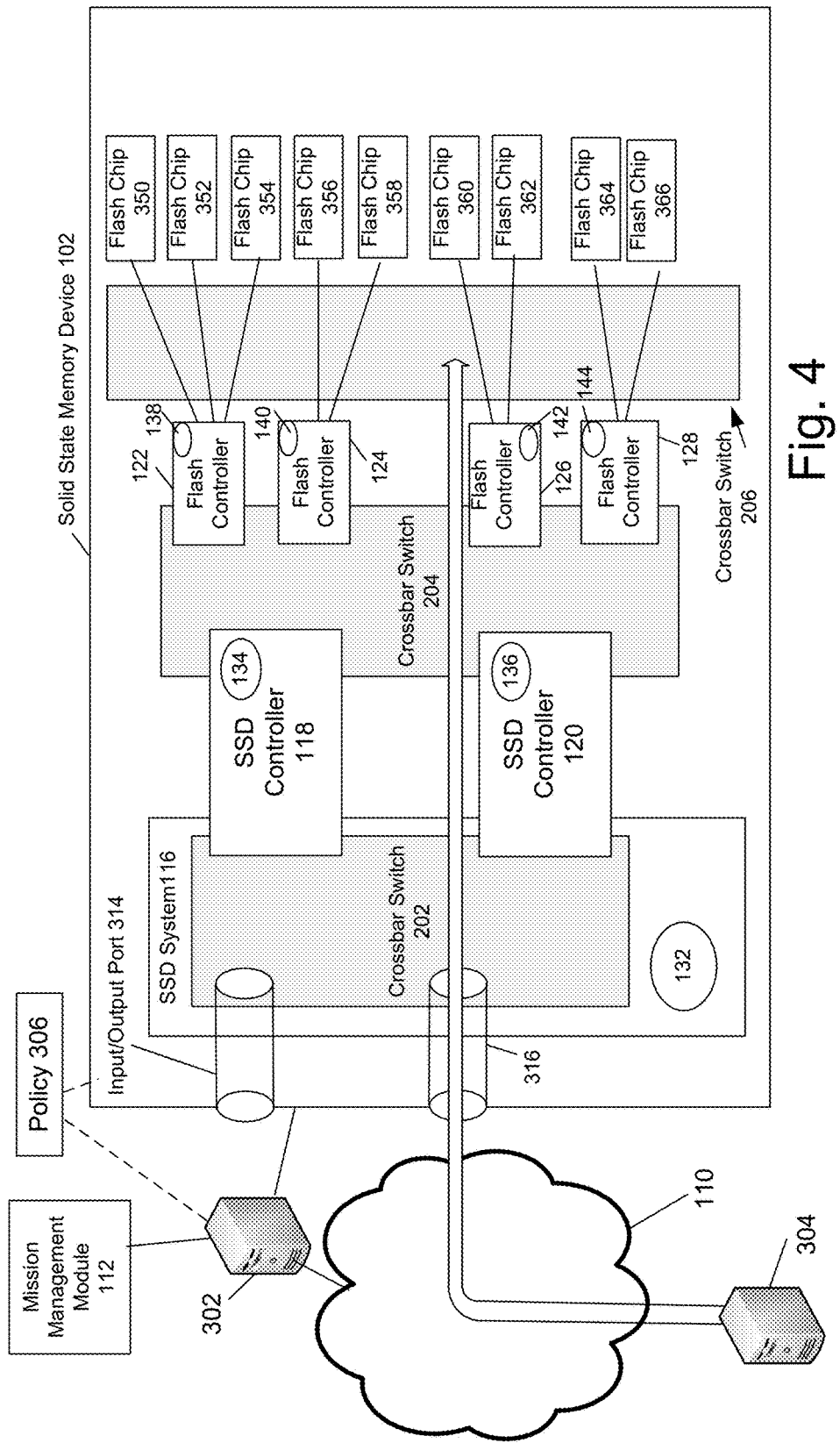
FIG. 4 illustrates the example solid state memory device of FIG. 1, illustrating an example where flash memory is dynamically allocated.

FIG. 4 illustrates an example solid state memory device of FIG. 1, illustrating an example where flash memory is dynamically allocated, arranged in accordance with at least some embodiments described herein. Those components in FIG. 4 that are labeled identically to components of FIGS. 1, 2 and 3 will not be described again for the purposes of clarity and brevity.

In an example, solid state memory device 102 may be configured to be in communication with data server 302. Data server 302 may be configured to be in communication with data server 304 via network 110. Solid state storage device 102 may include one or more flash chips including flash memory chips 350, 352, 354, 356, 358, 360, 362, 364 and 366. In an example, one or more of flash memory chips of solid state storage device 102 may be configured as direct attached storage ("DAS"). A flash memory chip may be configured as direct attached storage when the flash chip is accessible and usable by a local computing device without another intermittent computing device between the flash chip and the local computing device. In some examples, DAS storage may be coupled to a computing device without any network elements such as routers, switches, gateways, etc. in the network path between the computing device and the storage. In another example, in DAS storage, the communication medium between the computing device and the DAS storage element may not be shared amongst multiple computing devices.

In another example, one or more of flash memory chips of solid state storage device 102 may be configured as network attached storage ("NAS"). A flash memory chip may be configured as network attached storage when the flash chip is accessible and usable by a computing device over a network. An example of a computing device accessing a flash chip over a network may be, for example, data server 304 which may access flash memory chips of solid state storage device 102 through one or more intermittent computing devices (represented by network 110).

Flash memory chips of solid state storage device 102 may be dynamically allocated by configuring one or more of flash memory chips 350, 352, 354, 356, 358, 360, 362, 364 and 366 for either data attached storage or network attached storage. For example, flash memory chips of solid state storage device 102 may be configured as direct attached storage or network attached storage based on an identified storage policy 306 of data server 302 and/or solid state storage device 102. Policy 306 may specify a certain percentage, amount, identities, and/or a threshold of flash memory chips to be configured as either direct attached storage or network attached storage based on current memory demands of solid state memory device 102.

In an example, data server 302 may allocate flash memory chips 350, 352, 354, 356 and 358 of solid state storage device 102 to be configured as direct attached storage and flash memory chips 360, 362, 364 and 366 to be configured as network attached storage. Data server 302 may allocate flash memory chips through control of, for example, crossbar switches 202, 204 and/or 206. In the example, data server 302 may establish communication with flash memory chips 350, 352, 354, 356 and/or 358 through crossbar switches 202, 204 and 206. Data server 304 may establish communication with flash memory chips 360, 362, 364 and/or 366. SSD controller 118 and flash controllers 122, 124 may be configured for direct attached storage. SSD controller 120 and flash controllers 126 and 128 may be configured for network attached storage. Thereafter, data server 302 or solid state storage device 102 may determine, based on policy 306, that a greater amount of direct attached storage is to be used or otherwise made available. In the example, data server 302 may switch communication of flash memory chips 360 and 362 from data server 304 to data server 302 through crossbar switches 202, 204, 206 switching communication. In the example, data server 304 may maintain communication with flash memory chips 364 and/or 366. Accordingly, flash memory chips 360 and 362 may be reconfigured as direct attached storage to satisfy policy 306. Flash controller 126 and/or SSD controller 120 may be configured for direct attached storage.

In another example, data server 302 may allocate flash memory chips 350, 352, 354, 356 and 358 to be configured as direct attached storage and flash memory chips 360, 362, 364 and 366 to be configured as network attached storage. SSD controller 118 and flash controllers 122, 124 may be configured for direct attached storage, and SSD controller 120 and flash controllers 126 and 128 may be configured for network attached storage. Data server 302 or solid state storage device 102 may determine, based on policy 306, that a greater amount of network attached storage is to be used or otherwise made available. In the example, flash memory chips 350 and 352 may be reconfigured as network attached storage. Accordingly, flash controller 122 and/or SSD controller 118 may be configured for network attached storage.

Among other possible features, a system in accordance with the disclosure may allow for or otherwise enable dynamic switching between input/output ports and different flash memory chips. Crossbar switches may allow for or otherwise enable simultaneous reads from and writes to different flash memory chips resulting in enhanced bandwidth communication with flash memory chips. A solid state storage device may dynamically partition flash memory between direct attached storage and network attached storage. Dynamic partitioning may allow or otherwise enable a storage device to take advantage of the simplicity and performance of direct attached storage while relegating memory operations with higher latency tolerance to network attached storage. Additionally, if more direct attached storage is to be made available over time, more flash memory may be reassigned from network attached storage to direct attach storage thereby limiting potential lost storage space.

The mission management module may allow for or otherwise enable idle processor units of a solid state storage device to be used to perform various processing tasks. Assigning missions to processor elements of the solid state storage device may improve computing efficiency and reduce processing delays. Missions may be assigned to a particular processor element based on a data access profile for that processor element. Accordingly, missions with diverse data requirements may be executed by different processor elements of the same solid state storage device.

Figure 5:
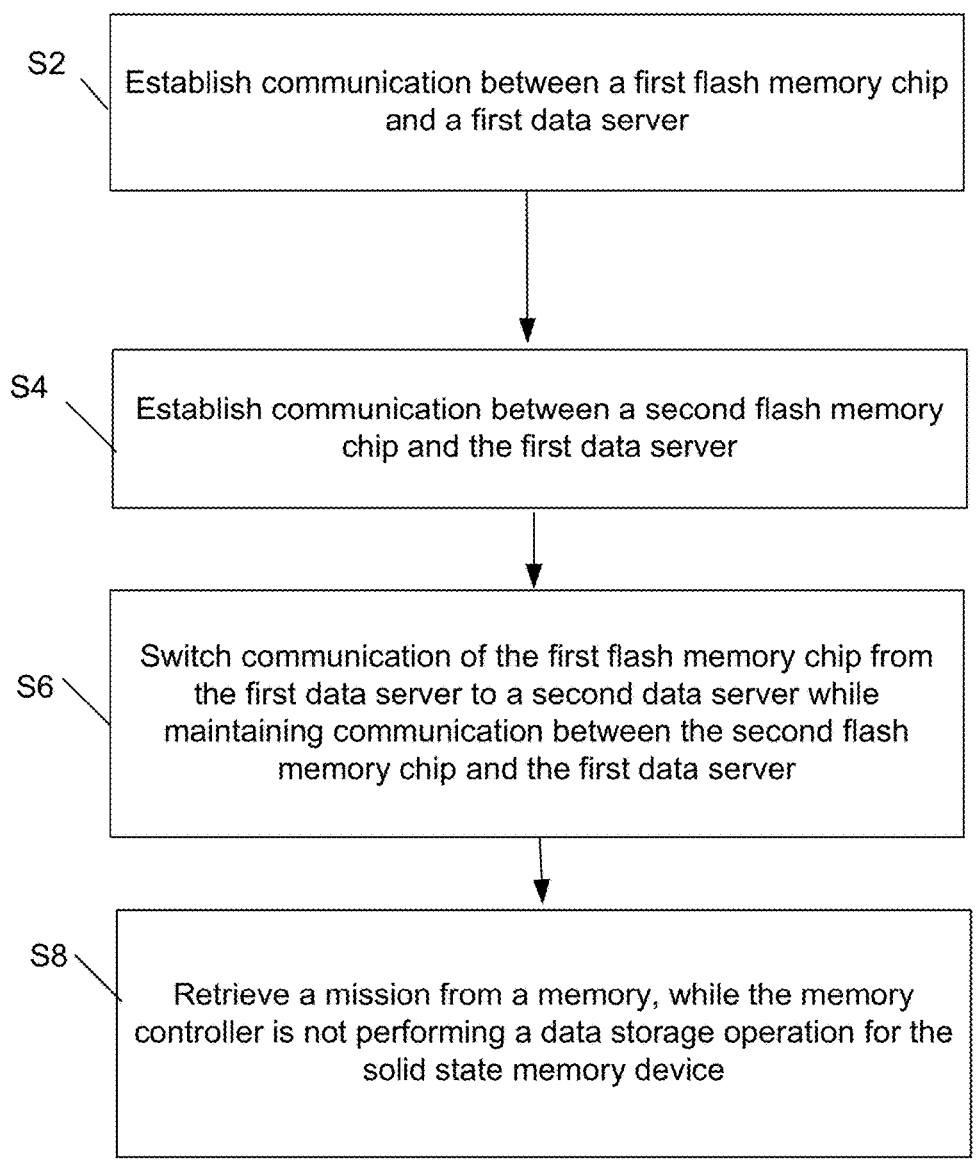
FIG. 5 depicts a flow diagram for an example process to implement utilization of solid state memory devices.

FIG. 5 depicts a flow diagram for example process to implement utilization of solid state storage devices, arranged in accordance with at least some embodiments described herein. In some examples, the process in FIG. 5 could be implemented using a memory system, such as memory system 100 discussed above. An example process may include one or more operations, actions, or functions as illustrated by one or more of blocks S2, S4, S6, and/or S8, etc. Although illustrated as discrete blocks, various blocks may be divided into additional blocks, combined into fewer blocks, or eliminated, depending on the particular implementation. Blocks may be supplemented with additional blocks representing other operations, actions, or functions. The process in FIG. 5 may be used by a solid state storage device, such as solid state storage device 102, described above. The memory system may include one or more flash memory chips, such as flash memory chips 150, 152, 154, 156, 158, 160, 162, 164, 166 and/or 168.

Processing may begin at block S2, "Establish communication between a first flash memory chip and a first data server." At block S2, communication may be established between a first flash memory chip and a first data server. Processing may continue from block S2 to block S4, "Establish communication between a second flash memory chip and the first data server." At block S4, communication may be established between a second flash chip and the first data server.

Processing may continue from block S4 to block S6, "Switch communication of the first flash memory chip from the first data server to a second data server while maintaining communication between the second flash memory chip and the first data server." At block S6, the first flash memory chip may switch from communication between the first flash memory chip and the first data server to communication between the first flash memory chip and a second data server. Switching may be based on a policy of the first data server. The policy may specify a percentage of flash memory chips allocated to the first data server. The policy may relate to an amount of direct attached storage usable by the first data server. The policy may relate to an amount of network attached storage usable by the first data server.

Switching communication may be performed by one or more crossbar switches. The crossbar switch may be configured between a solid state device controller and a flash controller. The crossbar switch may be configured between the flash controller and one or more flash memory chips. The crossbar switch may be configured between the solid state device controller and an input/output port. A first crossbar switch may be configured between the solid state device controller and the flash controller, a second crossbar switch may be configured between the flash controller and one or more flash memory chips, and a third crossbar switch may be configured between the input/output port and the solid state device controller.

Processing may continue from block S6 to block S8, "Retrieve a mission from a memory, while the memory controller is not performing a data storage operation for the solid state storage device." At block S8, a mission may be retrieved from a memory while the memory controller is not performing a data storage operation for the solid state storage device. The mission may relate to data in at least one of the flash memory chips of the solid state storage device. The memory controller may not be performing a data storage operation during a time frame between read/write operations of the solid state storage device. The processor element may suspend execution of the mission in response to receipt of a new data storage operation by the memory controller. The new data storage operation may be executed by the memory controller. Execution of the mission may be resumed after execution of the new data storage operation has completed.

Figure 6:
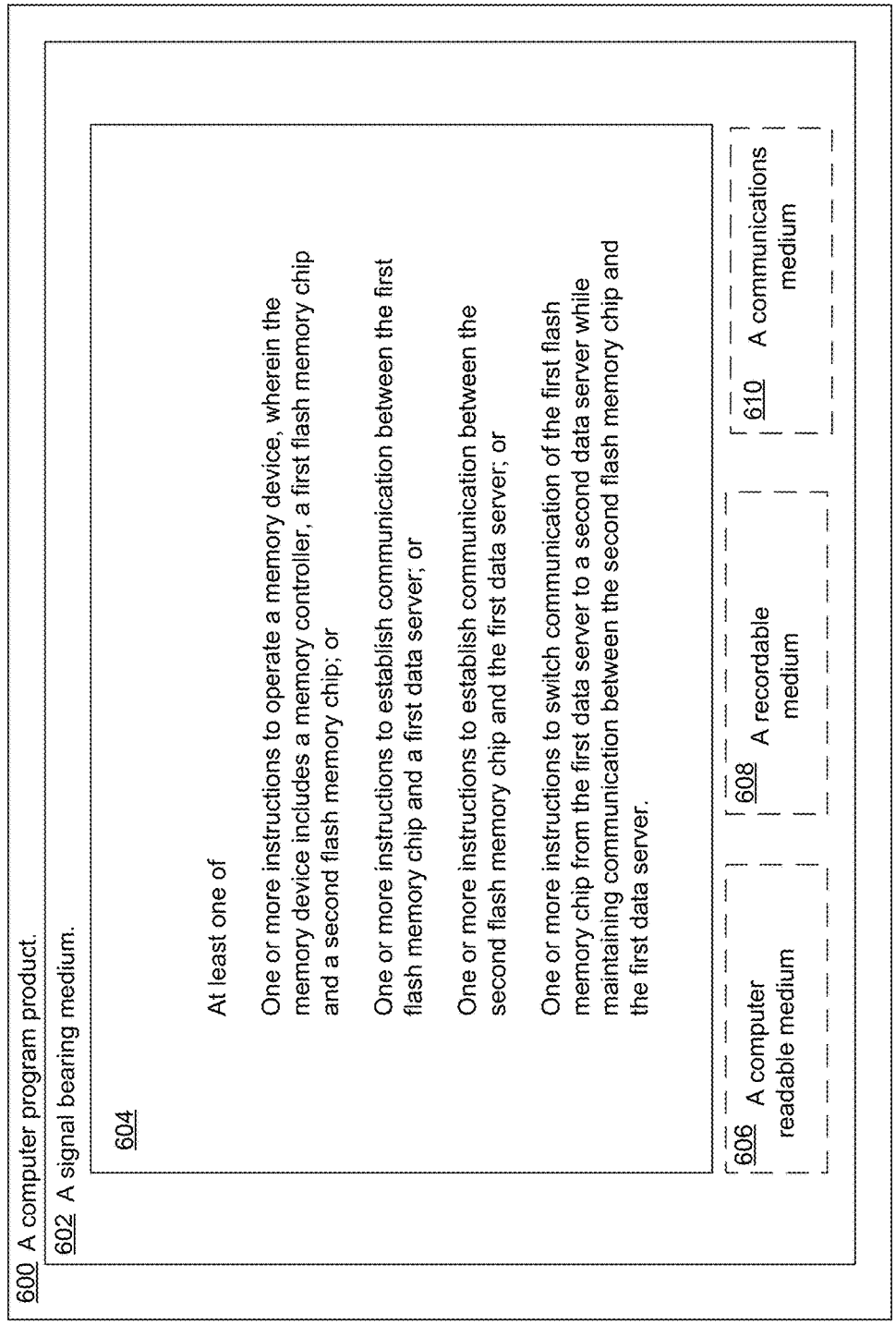
FIG. 6 illustrates an example computer program product that can be utilized to implement utilization of solid state memory devices.

FIG. 6 illustrates an example computer program product 600 that can be utilized to implement utilization of solid state memory devices arranged in accordance with at least some embodiments described herein. Computer program product 600 may include a signal bearing medium 602. Signal bearing medium 602 may include one or more instructions 604 that, in response to execution by, for example, a processor (such as a processor of data server 104) may provide the functionality and features described above with respect to FIGS. 1-5. Thus, for example, referring to memory system 100, solid state memory device 102 may undertake one or more of the blocks shown in FIG. 6 in response to instructions 604 conveyed to solid state storage device 102 by signal bearing medium 602.

In some implementations, signal bearing medium 602 may encompass a non-transitory computer-readable medium 606, such as, but not limited to, a hard disk drive (HDD), a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communication link, a wireless communication link, etc.). Thus, for example, computer program product 600 may be conveyed to one or more modules of the solid state storage device 102 by an RF signal bearing medium 602, where the signal bearing medium 602 is conveyed by a wireless communications medium 610 (e.g., a wireless communications medium conforming with the IEEE 802.11 standard).

FIG. 7 is a block diagram illustrating an example computing device 700 that is arranged to implement utilization of solid state memory devices, arranged in accordance with at least some embodiments described herein. In a very basic configuration 702, computing device 700 typically includes one or more processors 704 and a system memory 706. A memory bus 708, and/or one or more crossbar switches, such as crossbar switch 180, may be used for communicating between processor 704 and system memory 706.

Depending on the desired configuration, processor 704 (such as data server 104) may be of any type including but not limited to a microprocessor ($\mu P$), a microcontroller ($\mu C$), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP core), or any combination thereof. An example memory controller 718 (such as SSD controllers 118, 120) may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, one or more programmable circuits 766 and program data 724. Application 722 may include a utilization of solid state memory devices algorithm 726 that is arranged to perform the functions and operations as described herein including those described with respect to FIGS. 1-6 in connection with memory system 100. Program data 724 may include utilization of solid state memory devices data 728 that may be useful to implement utilization of solid state memory devices as is described herein. In some embodiments, application 722 may be arranged to operate with program data 724 in cooperation with operating system 720 such that utilization of solid state memory devices may be provided. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDDs), optical disk drives such as compact disk (CD) drives or digital versatile disk (DVDs) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are intended to be implied by the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, reagents, compounds compositions or biological systems, which can, of course, vary. Furthermore, the terminology used herein is for the purpose of describing particular embodiments only, and is not intended to be limiting.

With respect to the use of substantially any plural and/or singular terms herein, one can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" may be interpreted as "including but not limited to," the term "having" may be interpreted as "having at least," the term "includes" may be interpreted as "includes but is not limited to," etc.). If a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation may be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in to mean e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general, such a construction is intended to mean e.g., "a system having at least one of A, B, or C" would include but not be limited to systems that have A alone, B alone, C alone, A and B together, A and C together, B and C together, and/or A, B, and C together, etc. Virtually any disjunctive word and/or phrase presenting two or more alternative terms, whether in the description, claims, or drawings, may contemplate the possibilities of including one of the terms, either of the terms, or both terms. For example, the phrase "A or B" may include the possibilities of "A" or "B" or "A and B."

In addition, where features or aspects of the disclosure are described in terms of Markush groups, the disclosure may also be thereby described in terms of any individual member or subgroup of members of the Markush group.

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A memory device, comprising:
   one or more input/output ports configured to receive data at the memory device and facilitate transfer of data from the memory device;
   a memory controller configured to control access to data stored in the memory device, wherein the memory controller includes a solid state device controller configured to be in communication with a flash controller;
   at least one flash memory chip configured to store data in the memory device; and
   a crossbar switch coupled between the solid state device controller and the flash controller, wherein the crossbar switch is configured to allow the one or more input/output ports to access the at least one flash memory chip through the memory controller.

2. The memory device of claim 1, wherein the crossbar switch includes a plurality of transistors, wherein each transistor is effective to couple a particular output to a particular input.

3. The memory device of claim 1, further comprising another crossbar switch coupled between the flash controller and the at least one flash memory chip.

4. The memory device of claim 1, further comprising another crossbar switch coupled between the solid state device controller and the one or more input/output ports.

5. The memory device of claim 4, further comprising still another crossbar switch coupled between the flash controller and the at least one flash memory chip.

6. A method to operate a memory device, wherein the memory device includes a first flash memory chip and a second flash memory chip, the method comprising:
   establishing communication between the first flash memory chip and a first data server;

establishing communication between the second flash memory chip and the first data server; and switching communication of the first flash memory chip from the first data server to a second data server while maintaining communication between the second flash memory chip and the first data server.

7. The method of claim 6, wherein switching is based on a policy of the first data server, and wherein the policy specifies a percentage of flash memory chips allocated to the first data server.

8. The method of claim 6, wherein switching is based on a policy of the first data server, and wherein the policy relates to an amount of direct attached storage usable by the first data server.

9. The method of claim 6, wherein switching is based on a policy of the first data server, and wherein the policy relates to an amount of network attached storage usable by the first data server.

10. The method of claim 6, wherein the memory device further includes:

a solid state device controller configured to be in communication with an input/output port; and a flash controller configured to be in communication with the solid state device controller and the first and second flash memory chips, wherein:

switching communication includes using a crossbar switch configured between the solid state device controller and the flash controller to perform the switching communication.

11. The method of claim 6, wherein the memory device further includes:

a flash controller configured to be in communication with the first and second flash memory chips, wherein:

switching communication includes using a crossbar switch configured between the flash controller and the first and second flash memory chips to perform the switching communication.

12. The method of claim 6, wherein the memory device further includes:

a solid state device controller configured to be in communication with an input/output port, wherein:

switching communication includes using a crossbar switch configured between the solid state device controller and the input/output port to perform the switching communication.

13. The method of claim 6, wherein the memory device further includes:

a solid state device controller configured to be in communication with an input/output port; and a flash controller configured to be in communication with the solid state device controller and the first and second flash memory chips, wherein:

switching communication includes using, a first crossbar switch configured between the solid state device controller and the flash controller and a second crossbar switch configured between the flash controller and the first and second flash memory chips, to perform the switching communication.

14. The method of claim 6, wherein the memory device further includes:

a solid state device controller configured to be in communication with an input/output port; and a flash controller configured to be in communication with the solid state device controller and the first and second flash memory chips, wherein:

switching communication includes using, a first crossbar switch configured between the solid state device controller and the flash controller, a second crossbar switch configured between the flash controller and the first and second flash memory chips, and a third crossbar switch configured between the input/output port and the solid state device controller, to perform the switching communication.

15. A method to operate a memory device, the method comprising:

determining, by a memory controller of a solid state storage device, that a processor element of the memory controller is performing an operation other than a data storage operation for the solid state storage device;

based on the determination, retrieving, by the memory controller, a mission that relates to processing of data in one or more flash memory chips of the solid state storage device that are accessible by the processor element; and executing the mission by the processor element.

16. The method of claim 15, wherein determining that the processor element of the memory controller is performing the operation other than the data storage operation comprises determining that the memory controller is not performing the data storage operation during a time frame between read/write operations of the solid state storage device.

17. The method of claim 15, further comprising:

suspending execution of the mission by the processor element in response to receipt of a new data storage operation by the memory controller; and executing the new data storage operation by the memory controller.

18. The method of claim 17, further comprising resuming the execution of the mission after the execution of the new data storage operation has completed.

19. The method of claim 15, wherein retrieving the mission by the memory controller includes retrieving the mission by one of a solid state device controller and a flash controller.

20. A memory system, comprising:

a solid state storage device;

a first data server configured to be in communication with the solid state storage device; and a second data server configured to be in communication with the solid state storage device and the first data server, wherein the solid state storage device comprises:

one or more input/output ports configured to receive data at the solid state storage device and facilitate transfer of data from the solid state storage device;

a memory controller;

a first flash memory chip and a second flash memory chip configured to store data received through the one or more input/output ports in the solid state storage device; and a crossbar switch, wherein the memory controller is configured to:

control access to data stored in the solid state storage device; and control operation of the crossbar switch; and wherein the crossbar switch is configured to:

establish communication between the first data server and the first flash memory chip;

establish communication between the first data server and the second flash memory chip; and switch communication of the first flash memory chip from the first data server to the second data server while communication between the second flash memory chip and the first data server is maintained.

21. The memory system of claim 20, wherein:
the memory controller includes a solid state device controller configured to be in communication with a flash controller, and
the crossbar switch is coupled between the solid state device controller and the flash controller.

22. The memory system of claim 21, wherein the crossbar switch includes a first crossbar switch, and wherein the memory system further comprises:
a second crossbar switch, wherein the second crossbar switch is coupled between the one or more input/output ports and the solid state device controller.

23. A memory device, comprising:
one or more input/output ports configured to receive data at the memory device and facilitate transfer of data from the memory device;
a memory controller configured to control access to data stored in the memory device;
two or more flash memory chips configured to store data in the memory device; and
a crossbar switch coupled between the one or more input/output ports and the two or more flash memory chips, wherein the crossbar switch is configured to enable the one or more input/output ports to access the two or more flash memory chips through the memory controller, and
wherein the memory controller is further configured to:
while the memory controller is not performing a data storage operation for a solid state storage device, retrieve a mission that relates to data in at least one flash memory chip of the two or more flash memory chips that is to be processed; and
control a processor element of the memory controller to execute the mission, including provide access of the data by operation of the crossbar switch to couple the at least one flash memory chip of the two or more flash memory chips to the one or more input/output ports.

24. The memory device of claim 23, wherein the memory controller is further configured to control the processor element to:
suspend the execution of the mission in response to receipt of a new data storage operation by the memory controller; and
execute the new data storage operation.

25. The memory device of claim 24, wherein the memory controller is further configured to control the processor element to:
resume the execution of the mission after the execution of the new data storage operation has completed.

* * * * *